United States Patent [19]

Petrzilka et al.

[11] Patent Number: 4,526,704
[45] Date of Patent: Jul. 2, 1985

[54] MULTIRING LIQUID CRYSTAL ESTERS

[75] Inventors: Martin Petrzilka, Kaiseraugst; Martin Schadt, Seltisberg; Alois Villiger, Basel, all of Switzerland

[73] Assignee: Hoffmann-La Roche Inc., Nutley, N.J.

[21] Appl. No.: 512,846

[22] Filed: Jul. 11, 1983

[30] Foreign Application Priority Data

Jul. 28, 1982 [CH] Switzerland .............. 4581/82
May 5, 1983 [CH] Switzerland .............. 2443/83

[51] Int. Cl.³ .................. C09K 3/34; G02F 1/13; C07C 69/773; C07C 69/78
[52] U.S. Cl. ............... 252/299.61; 252/299.6; 252/299.63; 252/299.64; 252/299.65; 252/299.66; 350/350 R; 350/350 S; 560/1; 560/8; 560/59; 560/61; 560/62; 560/64; 560/65; 560/72; 560/73; 560/102; 560/106; 560/107; 560/108; 560/109; 560/116; 560/118
[58] Field of Search .......... 252/299.61, 299.6, 299.63, 252/299.64, 299.65, 299.66; 350/350 R, 350 S; 560/8, 1, 116, 118, 59, 61, 62, 64, 65, 72, 73, 102, 107, 106, 108, 109

[56] References Cited

U.S. PATENT DOCUMENTS

| | | | |
|---|---|---|---|
| 4,001,137 | 1/1977 | Steinstrasser | 252/299.67 |
| 4,065,489 | 12/1977 | Steinstrasser et al. | 252/299.65 |
| 4,149,413 | 4/1979 | Gray et al. | 252/299.63 |
| 4,222,888 | 9/1980 | Dubois et al. | 252/299.64 |
| 4,229,315 | 10/1980 | Krause et al. | 252/299.63 |
| 4,261,652 | 4/1981 | Gray et al. | 252/299.62 |
| 4,293,434 | 10/1981 | Deutscher et al. | 252/299.63 |
| 4,387,038 | 6/1983 | Fukui et al. | 252/299.63 |
| 4,387,039 | 6/1983 | Sugimuri et al. | 252/299.63 |
| 4,393,258 | 7/1983 | Sato et al. | 252/299.63 |
| 4,439,015 | 3/1984 | Rich et al. | 252/299.63 |
| 4,439,340 | 3/1984 | Kojima et al. | 252/299.63 |
| 4,460,770 | 7/1984 | Petrzilka et al. | 252/299.65 |
| 4,472,293 | 9/1984 | Sugimori et al. | 252/299.63 |
| 4,472,592 | 9/1984 | Takatsu et al. | 252/299.63 |
| 4,477,369 | 10/1984 | Sugimori et al. | 252/299.63 |
| 4,480,117 | 10/1984 | Takatsu et al. | 252/299.63 |

FOREIGN PATENT DOCUMENTS

| | | | |
|---|---|---|---|
| 8956 | 3/1980 | European Pat. Off. | 252/299.63 |
| 23730 | 2/1981 | European Pat. Off. | 252/299.63 |
| 56501 | 7/1982 | European Pat. Off. | 252/299.61 |
| 63003 | 10/1982 | European Pat. Off. | 252/299.63 |
| 87032 | 8/1983 | European Pat. Off. | 252/299.63 |
| 90671 | 10/1983 | European Pat. Off. | 252/299.63 |
| 3237367 | 4/1983 | Fed. Rep. of Germany | 252/299.63 |
| 3208089 | 9/1983 | Fed. Rep. of Germany | 252/299.63 |
| 3211601 | 10/1983 | Fed. Rep. of Germany | 252/299.63 |
| 3324774 | 1/1984 | Fed. Rep. of Germany | 252/299.63 |
| 3318533 | 1/1984 | Fed. Rep. of Germany | 252/299.63 |

(List continued on next page.)

OTHER PUBLICATIONS

Demus et al., Synthesis and Properties of New Liquid Crystalline Materials, Mol. Crystal Liq. Crystal, 63, 129–144 (1981).

Gray et al., Synthesis and Liquid Crystal Properties, Mol. Cryst. Liq. Cryst., 37, 189–211 (1976).

Notes from Lecture at Dainippon Nippon Inc., Japan (Jan. 28, 1983).

Eidenschīnk, R., Mol. Cryst. Liq. Cryst., vol. 94, pp. 119–125 (1983).

Heppke, G. et al., Mol. Cryst. Liq. Cryst., vol. 98, pp. 209–319 (1983).

U.S. patent application Ser. No. 341,926, filed Jan. 22, 1982–Rich et al.

U.S. patent application Ser. No. 432,212, filed Oct. 1, 1982–Petrizilka et al.

Primary Examiner—Teddy S. Gron
Attorney, Agent, or Firm—Jon S. Saxe; Bernard S. Leon; Elizabeth Manning

[57] ABSTRACT

Compounds of the formula

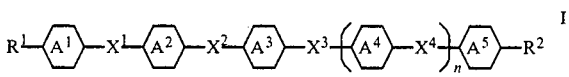

wherein n is 0 or 1; one of $X^1$ and $X^2$ is —COO— or —OOC— and the other is a single covalent bond or —CH$_2$CH$_2$—; $X^3$ and $X^4$ individually are a single covalent bond or —CH$_2$CH$_2$—, with the proviso that at most one of $X^1$, $X^2$, $X^3$ and $X^4$ is —CH$_2$CH$_2$—; rings $A^1$ and $A^5$ individually are a group of the formula

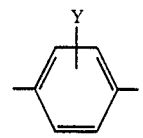

or trans-1,4-cyclohexylene; rings $A^2$, $A^3$ and $A^4$ individually are a group of formula II or, when ring $A^2$, $A^3$ or $A^4$ is not linked with at least one of the other two of these rings by a single covalent bond then such ring also can be trans-1,4-cyclohexylene, with the proviso that at least one of rings $A^1$ through $A^5$ is a group of formula II; Y is hydrogen, or when Y is attached to a ring of formula II which is not linked with another ring via a single covalent bond, Y also can be fluorine, chlorine or methyl; and $R^1$ and $R^2$ individually are straight-chain alkyl of 1–7 carbon atoms, or when $R^1$ or $R^2$ is attached to a ring of formula II such $R^1$ or $R^2$ also can be straight-chain alkoxy of 1 to 7 carbon atoms; their manufacture and use for electro-optical and chromatographical purposes and liquid crystalline mixtures containing these compounds are described.

16 Claims, No Drawings

FOREIGN PATENT DOCUMENTS

| | | | |
|---|---|---|---|
| 3335550 | 4/1984 | Fed. Rep. of Germany | 252/299.63 |
| 57-9742 | 1/1982 | Japan | 252/299.63 |
| 57-48945 | 3/1982 | Japan | 252/299.63 |
| 57-64645 | 4/1982 | Japan | 252/299.63 |
| 57-70839 | 5/1982 | Japan | 252/299.63 |
| 57-91953 | 6/1982 | Japan | 252/299.63 |
| 57-159743 | 10/1982 | Japan | 252/299.63 |
| 57-209252 | 12/1982 | Japan | 252/299.63 |
| 58-8022 | 1/1983 | Japan | 252/299.63 |
| 58-8023 | 1/1983 | Japan | 252/299.63 |
| 58-55447 | 4/1983 | Japan | 252/299.63 |
| 2092146 | 8/1982 | United Kingdom | 252/299.63 |

MULTIRING LIQUID CRYSTAL ESTERS

BACKGROUND OF THE INVENTION

1. Field of the Invention

This invention relates to liquid crystalline compounds and mixtures.

2. Background Description

Liquid crystals recently have gained considerable importance primarily as dielectrics in indicating, devices, since the optical properties of such substances can be influenced by an applied voltage. Electro-optical indicating devices which utilize liquid crystal cells are well known to the person skilled in the art and can be based on various effects such as, for example, dynamic scattering, deformation of aligned phases (DAP type), the Schadt-Helfrich effect (rotation cell), the "guest-host effect" or a cholestericnematic type phase transition.

Liquid crystals must satisfy a number of requirements in order to be suitable as dielectrics for electro-optical indicating devices. For example, the liquid crystals must have a high chemical stability towards environmental factors (e.g. heat, air, moisture and the like), must be photochemically stable and colorless, must have short response times, must not be too high a viscosity, must have a nematic or cholesteric-type mesophase in all temperature ranges in which the liquid crystal cell is to be operated, and must give a good contrast. Other properties such as, for example, the threshold potential, the dielectric anisotropy and the electrical conductivity must fulfill different conditions depending on the type of cell which is used.

Since, in general, it is not possible to achieve all desired and to some extent contradictory properties with a single compound, attempts have been made to use several components so as to produce optimal properties for the particular application. In this case it is, however, important that the components undergo no chemical reactions with one another and can be mixed well. Further, ideally the mixtures should have no or small smectic mesophases.

Moreover, the customary liquid crystal mixture components with low viscosities generally have only low clearing points or are not liquid crystalline. Thus, components having high clearing points must frequently be added to the mixtures. Disadvantageously, the latter components generally greatly increase the viscosity of the mixtures.

Furthermore, liquid crystals have also been effectively used as stationary phases in gas chromatography. However, the known stationary phases have, above all, the disadvantage that they can be used only up to temperatures of about 180° C.

Through the present invention, novel liquid crystalline compounds have been found which avoid the aforementioned disadvantages.

SUMMARY OF THE INVENTION

The present invention concerns monoesters of the formula

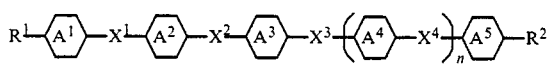

wherein n stands for the number 0 or 1; one of the groups $X^1$ and $X^2$ signifies an ester group —COO— or —OOC— and the remainder of the groups $X^1$, $X^2$, $X^3$ and $X^4$ signify a single covalent bond or one of these groups signifies the ethylene group —CH$_2$CH$_2$—; the rings $A^1$ and $A^5$ signify a group of the formula

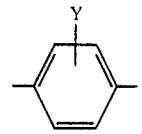

II or trans-1,4-cyclohexylene; the rings $A^2$, $A^3$ and $A^4$ signify a group of formula II or, when they are not linked with at least one of the other two of these rings by a single covalent bond, also trans-1,4-cyclohexylene; with the proviso that at least one of the rings present is a group of formula II; Y signifies hydrogen or on one of the rings of formula II which is not linked with a further ring via a single covalent bond also fluorine, chlorine or methyl; and $R^1$ and $R^2$ signify straight-chain alkyl containing 1 to 7 carbon atoms or on a ring of formula II also straight-chain alkoxy containing 1 to 7 carbon atoms.

The invention is also concerned with the manufacture of the compounds of formula I liquid crystalline mixtures which contain compounds of formula I as well as their use for electro-optical and chromatographical purposes.

DETAILED DESCRIPTION OF THE INVENTION

The present invention is concerned with novel liquid crystalline compounds, namely tetracyclic and pentacyclic monoesters of the formula

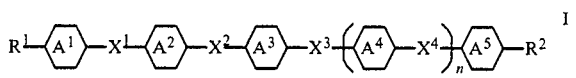

I wherein n is 0 or 1; one of $X^1$ and $X^2$ is —COO— or —OOC— and the other is a single covalent bond or —CH$_2$CH$_2$—; $X^3$ and $X^4$ individually are a single covalent bond or —CH$_2$CH$_2$—, with the proviso that at most one of $X^1$, $X^2$, $X^3$ and $X^4$ is —CH$_2$CH$_2$—; rings $A^1$ and $A^5$ individually are a group of the formula

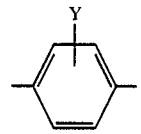

II or trans-1,4-cyclohexylene; rings $A^2$, $A^3$ and $A^4$ individually are a group of formula II or, when ring $A^2$, $A^3$ or $A^4$ is not linked with at least one of the other two of these rings by a single covalent bond then such ring also can be trans-1,4-cyclohexylene, with the proviso that at least one of rings $A^1$ through $A^5$ is a group of formula II; Y is hydrogen, or when Y is attached to a ring of formula II which is not linked with another ring via a single covalent bond, Y also can be fluorine, chlorine or methyl; and $R^1$ and $R^2$ individually are straight-chain alkyl of 1–7 carbon atoms, or when $R^1$ or $R^2$ is attached to a ring of formula II such $R^1$ or $R^2$ also can be straight-chain alkoxy of 1 to 7 carbon atoms.

Unless otherwise stated, "alkyl" denotes a straight-chain alkyl group of 1 to 12 carbon atoms or a branched-chain alkyl group of 1 to 12 carbon atoms. Exemplary straight-chain alkyl groups are methyl, ethyl, propyl, butyl, pentyl, hexyl, heptyl octyl, nonyl, decyl, undecyl and dodecyl. Exemplary branched-chain alkyl groups are isopropyl, isobutyl, sec-butyl, 1-methylbutyl, 2-methylbutyl 3-methylpentyl, 4-methylhexyl and isopentyl. Lower alkyl denotes straight-chain and branched-chain alkyl groups of 1 to 5 carbon atoms.

The term "alkoxy" as well as any other groups in the specification containing "alkyl" denote moieties in which their "alkyl" portions are as defined previously. In particular, straight-chain alkoxy groups denote moieties having a straight-chain alkyl portion as previously defined.

The compounds provided by the invention contain four or five p-phenylene and/or trans-1,4-cyclohexylene groups, whereby one of the optionally present p-phenylene groups which is not linked via a single covalent bond directly to one of the remaining rings (p-phenylene or trans-1,4-cyclohexylene) can carry a lateral fluorine, chlorine or methyl substituent. At least one of the rings present (i.e. at least one of the rings $A^1$–$A^5$ when n stands for 1 or at least one of the rings $A^1$, $A^2$, $A^3$ and $A^5$ when n stands for 0, signifies a group of formula II.

Those of rings $A^2$, $A^3$ and $R^4$ which are joined via a single covalent bond directly to at least one of the other two of these rings signify p-phenylene. On the other hand, a trans-1,4-cyclohexylene group which may be present as ring $A^2$ can be linked directly via a single covalent bond with ring $A^1$ and a trans-1,4-cyclohexylene group which may be present as ring $A^3$ or $A^4$ can be linked directly with ring $A^5$ via a single covalent bond.

If $X^1$ of formula I is an ester group, then $X^2$, $X^3$ and $X^4$ signify single covalent bonds or one of these groups also signifies the ethylene group. Correspondingly, $X^1$, $X^3$ and $X^4$ signify single covalent bonds or one of these groups also signifies the ethylene group when $R^2$ represents an ester group.

The groups $R^1$ and $R^2$ can be the same or different and signify alkyl of 1 to 7 carbon atoms (e.g., methyl, ethyl, propyl, butyl, pentyl, hexyl, heptyl). When $R^1$ or $R^2$ is positioned on a ring of formula II, such $R^1$ or $R^2$ also can be alkoxy of 1–7 carbon atoms (e.g., methoxy, ethoxy, propyloxy, butyloxy, pentyloxy, hexyloxy or heptyloxy).

The inventive compounds are very well suited as components of liquid crystalline mixtures, since they surprisingly at the same time have large mesophase ranges with high clearing points, remarkably low melting points, low viscosities and correspondingly short response times. Further, the compounds provided by the invention have small absolute values of the dielectric anisotropies and generally a nematic and/or smectic mesophase. Furthermore, they have a good chemical and photochemical stability and are colourless. The compounds provided by the invention can be widely used, since they are miscible with other liquid crystals and since liquid crystals having nematic or cholesteric mesophases can be manufactured readily by mixing the present compounds with other liquid crystalline and/or non-liquid crystalline compounds. Those compounds which carry a lateral fluorine, chlorine or methyl substituent are above all distinguished by especially good solubility. On the basis of the aforementioned properties the compounds provided by the invention are especially suitable for increasing the clearing points of mixtures having low viscosities, since in this case the viscosity is not increased or is increased only insignificantly.

Further, the compounds provided by the invention are extremely selective stationary phases in gas chromatography and, on the basis of their high clearing points and boiling points, they can be used at distinctly higher working temperatures than the previously known phases. In many cases they can be used without problems up to the working temperatures of about 250° C. which are usual in gas chromatography.

The aforementioned advantages in using the inventive compounds in gas chromatography and in the clearing point increase of liquid crystalline dielectrics apply especially in the case of the pentacyclic compounds of formula I (n=1).

The compounds of formula I in which Y signifies hydrogen and therefore formula II signifies 1,4-phenylene (i.e. those compounds which carry no lateral substituents) are preferred.

Further, at least one of the rings preferably signifies trans-1,4-cyclohexylene. If formula I contains an ethylene group —$CH_2CH_2$—, then $X^1$ preferably signifies the ethylene group (and accordingly $X^2$ signifies an ester group). Further, in compounds of formula I in which one of the groups $X^1$–$X^4$ signifies the ethylene group at least one of the two rings linked directly to the ethylene group is advantageously trans-1,4-cyclohexylene. However, there are generally preferred those compounds of formula I in which one of the groups $X^1$ and $X^2$ signifies an ester group —COO— or —OOC— and the remainder of the groups $X^1$, $X^2$, $X^3$ and $X^4$ signify a single covalent bond. Further, there are preferred those compounds of formula I in which at least one of the two rings linked directly to the ester group $X^1$ or $X^2$ (preferably the ring linked to the oxygen atom of the ester group) signifies a group of formula II; this applies especially in the case of the tetracyclic compounds. Furthermore, there are basically preferred those compounds of formula I in which n stands for the number 1. Further, $X^2$ preferably signifies an ester group when n stands for the number 1.

Especially suitable compounds of formula I are therefore those in which one of the groups $X^1$ and $X^2$ signifies an ester group —COO— or —OOC— and the remainder of the groups $X^1$, $X^2$, $X^3$ and $X^4$ signify a single covalent bond; the rings $A^1$ and $A^5$ signify 1,4-phenylene or trans-1,4-cyclohexylene; the rings $A^2$, $A^3$ and $A^4$ signify 1,4-phenylene or, when they are not linked with at least one of the other two of these rings by a single covalent bond, also trans-1,4-cyclohexylene; and at least one of the rings present signifies 1,4-phenylene (preferably one of the rings linked to the ester group) and at least one of the rings present signifies trans-1,4-cyclohexylene. Further, it is preferred that n stands for the number 1 and/or that $X^2$ signifies an ester group —COO— or —OOC—.

Preferred groups denoted by $R^1$ and $R^2$ are the straight-chain alkyl groups containing 1 to 7 carbon atoms. Furthermore, there are preferred those compounds of formula I in which the sum of the carbon atoms in the groups $R^1$ and $R^2$ is 5 to 10.

The monoesters provided by the invention embrace, inter alia, the compounds of the following formulae:

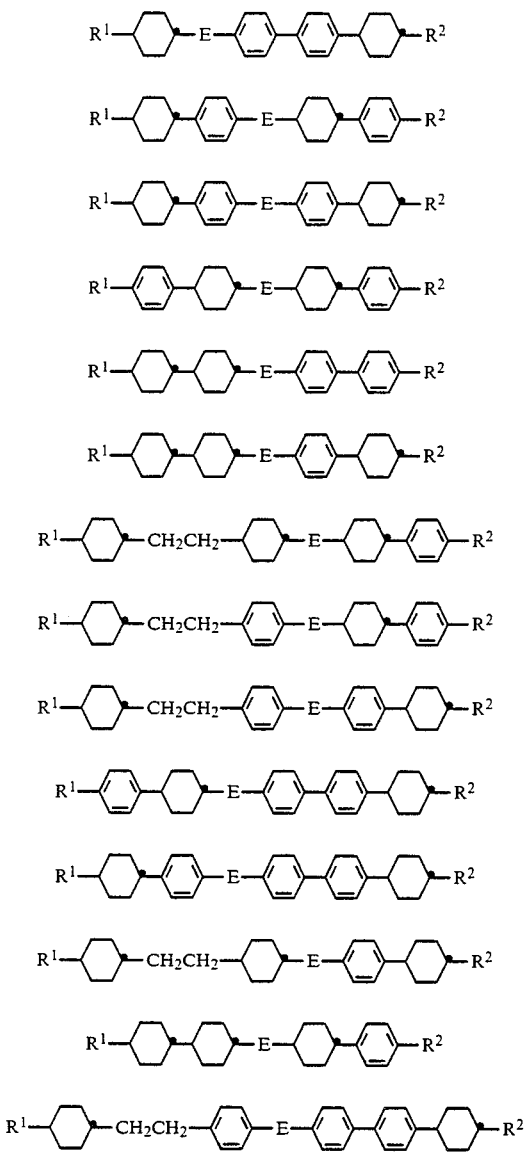

Ia
Ib
Ic
Id
Ie
If
Ig
Ih
Ii
Ij
Ik
Il
Im
In wherein $R^1$ and $R^2$ have the above significances and E signifies an ester group —COO— or —OOC—.

Examples of preferred compounds provided by the invention are the compounds of formulae Ia–In above in which $R^1$, $R^2$ and E each have the significances given in Table 1 as well as the compounds of formula I referred to in the Examples hereinafter.

TABLE 1

| $R^1$ | E | $R^2$ |
|---|---|---|
| Ethyl | —COO— | Pentyl |
| Propyl | —COO— | Propyl |
| Propyl | —COO— | Butyl |
| Propyl | —COO— | Pentyl |
| Butyl | —COO— | Propyl |
| Butyl | —COO— | Butyl |
| Butyl | —COO— | Pentyl |
| Pentyl | —COO— | Ethyl |
| Pentyl | —COO— | Propyl |
| Pentyl | —COO— | Butyl |
| Pentyl | —COO— | Pentyl |
| Ethyl | —OOC— | Pentyl |
| Propyl | —OOC— | Propyl |
| Propyl | —OOC— | Butyl |

TABLE 1-continued

| $R^1$ | E | $R^2$ |
|---|---|---|
| Propyl | —OOC— | Pentyl |
| Butyl | —OOC— | Propyl |
| Butyl | —OOC— | Butyl |
| Butyl | —OOC— | Pentyl |
| Pentyl | —OOC— | Ethyl |
| Pentyl | —OOC— | Propyl |
| Pentyl | —OOC— | Butyl |
| Pentyl | —OOC— | Pentyl |

Preferably, E signifies —OOC— in formulae Ib, Ih, Ii, Ik, Im and In above and —COO— in formulae Ia, Ic–Ig and Ii–In above. Applicants especially prefer the compounds of formulae Ia, Ic, If, Ij, Im, In and particularly those of formula Ik.

The compounds of formula I can be manufactured in accordance with the following process: (a) for the manufacture of the compounds of formula I in which $X^1$ signifies an ester group —COO— or —OOC—, esterifying a compound of the formula

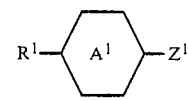

III and a compound of the formula

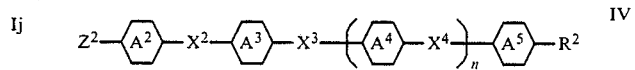

IV wherein one of the groups $Z^1$ and $Z^2$ signifies the carboxyl group and the other signifies the hydroxy group and $A^1$, $A^2$, $A^3$, $A^4$, $A^5$, $R^1$, $R^2$, $X^2$, $X^3$, $X^4$ and n have the significances given above, or a reactive derivative of these compounds, or (b) for the manufacture of the compounds of formula I in which $X^2$ signifies an ester group —COO— or —OOC—, esterifying a compound of the formula

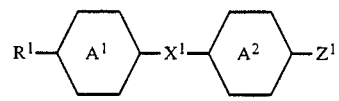

V and a compound of the formula

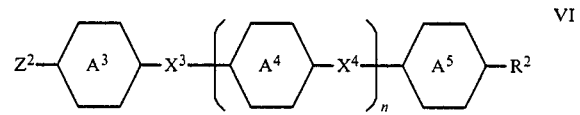

VI wherein one of the groups $Z^1$ and $Z^2$ signifies the carboxyl group and the other signifies the hydroxy group and $A^1$, $A^2$, $A^3$, $A^4$, $A^5$, $R^1$, $R^2$, $X^1$, $X^3$, $X^4$ and n have the significances given above, or a reactive derivative of these compounds.

These reactions can be carried out in a known manner by esterifying the carboxylic acid or a reactive derivative thereof (e.g. an acid chloride, bromide or anhydride) with the corresponding hydroxy compound or a suitable salt thereof (e.g. the sodium salt). A preferred method is the reaction of the acid chloride (which is obtainable from the carboxylic acid by, for example, heating with thionyl chloride) with the hydroxy compound. This reaction is conveniently carried out in an inert organic solvent, for example an ether such as diethyl ether or tetrahydrofuran, dimethylformamide, benzene, toluene, cyclohexane, carbon tetrachloride and the like. In order to bind the hydrogen chloride liberated in the reaction there is conveniently used an acid-binding agent, for example a tertiary amine, pyridine and the like. The acid-binding agent can also simultaneously serve as the solvent. Further preferred methods are the reaction of the carboxylic acid with the hydroxy compound in the presence of 4-(dimethylamino)pyridine and N,N'-dicyclohexylcarbodiimide or in the presence of oxalyl chloride and dimethylformamide [P. A. Stadler, Helv. Chim. Acta 61, 1675 (1978)]. The temperature and pressure at which the above esterification reactions are carried out are not critical, the reactions generally being carried out at atmospheric pressure and a temperature between about −30° C. and the boiling point of the reaction mixture.

The compounds of formulae III–VI are known or are analogues of known compounds or can be prepared from known compounds according to conventional methods.

For example, the compounds of formula IV in which $Z^2$ signifies carboxyl, $A^2$ signifies p-phenylene and $X^2$ signifies the ethylene group, the compounds of formula V in which $Z^1$ signifies carboxyl, $A^2$ signifies p-phenylene and $X^1$ signifies the ethylene group and the compounds of formula VI in which $Z^2$ signifies carboxyl, $A^3$ signifies p-phenylene and $X^3$ signifies the ethylene group can also be prepared by reacting methyl p-formylbenzoate in a Wittig reaction with the corresponding phosphonium salt, then catalytically hydrogenating the double bond (e.g. in the presence of palladium as the catalyst) and saponifying the ester obtained. The corresponding hydroxy compounds can also be prepared according to the same method by using p-acetoxybenzaldehyde as the starting material.

The compounds of formula IV in which $A^2$ signifies trans-1,4-cyclohexylene and $X^2$ signifies the ethylene group, the compounds of formula V in which $A^2$ signifies trans-1,4-cyclohexylene and $X^1$ signifies the ethylene group and the compounds of formula VI in which $A^3$ signifies trans-1,4-cyclohexylene and $X^3$ signifies the ethylene group can also be prepared, for example, by reacting 4-cyanocyclohexanecarboxaldehyde in a Wittig reaction with the corresponding phosphonium salt and then catalytically hydrogenating the double bond. The cyano compound obtained can then either be converted by saponification into the carboxylic acid or can be converted into the corresponding hydroxy compound by reaction with methyl lithium, methylmagnesium bromide and the like, subsequent Baeyer-Villiger oxidation (e.g. with m-chloroperbenzoic acid) and saponification of the ester obtained.

In an analogous manner to the above reactions there can also be prepared those compounds of formulae IV and VI which contain an ethylene group and two or three rings between the ethylene group and the carboxyl or hydroxy group.

The compounds of formula I can be used in the form of mixtures with other suitable liquid crystalline or non-liquid crystalline substances such as, for example, with substances from the classes of Schiff's bases, azobenzenes, azoxybenzenes, phenylbenzoates, cyclohexanecarboxylic acid phenyl esters, cyclohexanecarboxylic acid cyclohexyl esters, biphenyls, terphenyls, phenylcyclohexanes, cyclohexylbiphenyls, cinnamic acid derivatives, phenylpyrimidines, diphenylpyrimidines, cyclohexylphenylpyrimidines, phenyldioxanes, 2-cyclohexyl-1-phenylethanes and the like. Such substances are known to the person skilled in the art and many of them are, moreover, commercially available.

The liquid crystalline mixtures provided by the invention contain, in addition to one or more compounds of formula I, preferably one or more of the following compounds:

4-Cyanobiphenyls of the formula

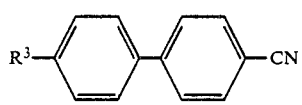

VII wherein $R^3$ signifies a straight-chain alkyl or alkoxy group containing 2 to 7 carbon atoms, p-(trans-4-alkylcyclohexyl)benzonitriles of the formula

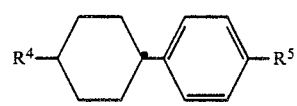

VIII wherein $R^4$ signifies a straight-chain alkyl group containing 2 to 7 carbon atoms and $R^5$ signifies cyano or a straight-chain alkyl group containing 1 to 7 carbon atoms, p-(5-alkyl-2-pyrimidinyl)benzonitriles of the formula

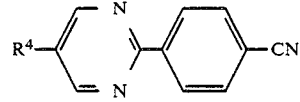

IX wherein $R^4$ has the above significance, p-[5-(trans-4-alkylcyclohexyl)-2-pyrimidinyl]benzonitriles of the formula

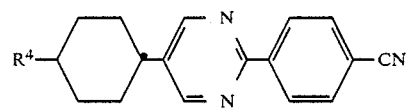

X wherein $R^4$ has the above significance, p-(trans-5-alkyl-m-dioxan-2-yl)benzonitriles of the formula

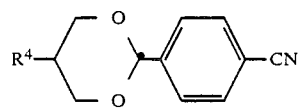

XI wherein $R^4$ has the above significance, p-alkylbenzoic acid phenyl esters of the formula

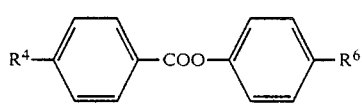

XII wherein $R^6$ signifies the cyano group or a straight-chain alkoxy group containing 1 to 6 carbon atoms and $R^4$ has the above significance, trans-4-alkylcyclohexanecarboxylic acid phenyl esters of the formula

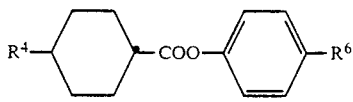   XIII wherein R⁴ and R⁶ have the above significances, 2-(trans-4-alkylcyclohexyl)-1-phenylethanes of the formula

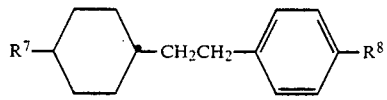   XIV wherein R⁷ signifies a straight-chain alkyl group containing 3 to 7 carbon atoms and R⁸ signifies the cyano group or a straight-chain alkyl or alkoxy group containing 1 to 7 carbon atoms,
4″-alkyl-4-cyano-p-terphenyls of the formula

   XV wherein R⁴ has the above significance, and/or 4′-(trans-4-alkylcyclohexyl)-4-cyanobiphenyls of the

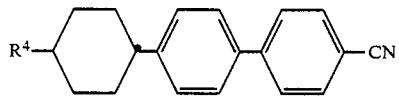   XVI wherein R⁴ has the above significance.

The mixtures provided by the invention can contain one or more compounds of formula I. Mixtures which contain one or more compounds of formula I in an amount of about 1 weight % to about 40 weight % and one or more other suitable liquid crystalline and/or non-liquid crystalline substances are preferred. Mixtures which contain about 3 weight % to about 20 weight % of compounds of formula I are especially preferred.

Further, the mixtures provided by the invention can contain suitable optically active compounds (e.g. optically active biphenyls) and/or dichroic colouring substances (e.g. azo, azoxy and anthraquinone colouring substances). The amount of such compounds is determined by the solubility and the desired pitch, colour, extinction and the like. Preferably, the amount of optically active compounds is at most about 4 weight % and the amount of dichroic colouring substances is at most about 10 weight %.

The manufacture of the liquid crystalline mixtures and of the electro-optical devices can be carried out in a known manner.

The use of the compounds provided by the invention for or as liquid crystalline stationary phases in gas chromatography can be carried out in a known manner and on conventional carrier materials. The compounds provided by the invention are especially suitable for the separation of isomer mixtures which can not be separated or which can be separated only with difficulty using conventional stationary phases such as, for example, cis/trans-isomeric 1,4-disubstituted cyclohexanes, isomeric aromatic hydrocarbons (e.g. xylenes, phenenthrene/anthracene), double bond isomers (e.g. unsaturated fatty acid esters) and the like.

The invention is also concerned with all novel compounds, mixtures, processes, uses and devices as described herein.

The following mixtures 1–4 are examples of preferred mixtures provided by the invention for electro-optical uses. $\Delta\epsilon$ signifies the dielectric antisotropy, $V_{10}$ or $V_{50}$ signifies the threshold potential for 10% or 50% transmission (measured in a rotation cell with 8 μm plate separation and 0° tilt angle), $t_{on}$ signifies the switching-on time (0–50% transmission), $t_{off}$ signifies the switching-off time (100%–10% transmission), $\eta$ signifies the viscosity (bulk viscosity), $N_{max}$ signifies the maximum number of multiplexible lines and $\Delta n$ signifies the optical antisotropy. Unless otherwise indicated, all mixture Examples were prepared as written.

| Mixture 1 | |
|---|---|
| 6.55 weight % of | 4′-ethyl-4-cyanobiphenyl, |
| 3.65 weight % of | 4′-propyl-4-cyanobiphenyl, |
| 5.83 weight % of | 4′-butyl-4-cyanobiphenyl, |
| 18.94 weight % of | 4′-phentyl-4-cyanobiphenyl, |
| 4.37 weight % of | 4″-phentyl-4-cyano-p-terphenyl, |
| 4.37 weight % of | 4′-(trans-4-pentylcyclohexyl)-4-cyanobiphenyl, |
| 3.92 weight % of | 1-(trans-4-pentylcyclohexyl)-4-propylbenzene, |
| 7.29 weight % of | trans-4-butylcyclohexanecarboxylic acid p-ethoxyphenyl ester, |
| 7.29 weight % of | trans-4-pentylcyclohexanecarboxylic acid p-methoxyphenyl ester |
| 14.56 weight % of | 2-(trans-4-pentylcyclohexyl)-1-(p-ethoxyphenyl)ethane, |
| 5.59 weight % of | 1-[2-(trans-4-butylcyclohexyl)ethyl]-4-(trans-4-pentylcyclohexyl)benzene, |
| 5.49 weight % of | 4-[2-(trans-4-butylcyclohexyl)ethyl]-4′-(trans-4-pentylcyclohexyl)biphenyl, |
| 7.84 weight % of | 4-[2-(trans-4-butylcyclohexyl)ethyl]-4′-(trans-4-pentylcyclohexyl)-1,1′-ethylene-dibenzene, |
| 4.32 weight % of | 4′-(trans-4-pentylcyclohexyl)-4-biphenylcarboxylic acid p-(trans-4-propylcyclohexyl)phenyl ester; | m.p.<−30° C., cl.p. 98° C., nematic; $\Delta\epsilon=7.37$; $V_{10}=2.55$ V, $V_{50}=2.88$ V; $t_{on}=28$ ms, $t_{off}=48$ ms; $\eta=27$ cP; $N_{max}=68$; $\Delta n=0.151$.

| Mixture 2 | |
|---|---|
| 4.49 weight % of | 4′-ethyl-4-cyanobiphenyl, |
| 2.99 weight % of | 4′-propyl-4-cyanobiphenyl, |
| 5.09 weight % of | 4′-butyl-4-cyanobiphenyl, |
| 13.82 weight % of | 4-(trans-4-pentylcyclohexyl)benzonitrile, |
| 4.40 weight % of | 4″-pentyl-4-cyano-p-terphenyl, |
| 4.49 weight % of | 4′-(trans-4-pentylcyclohexyl)-4-cyanobiphenyl, |
| 7.41 weight % of | trans-4-butylcyclohexanecarboxylic acid p-ethoxyphenyl ester, |
| 6.59 weight % of | trans-4-pentylcyclohexanecarboxylic acid p-methoxyphenyl ester, |
| 3.10 weight % of | 2-(trans-4-propylcyclohexyl)-1-(p-ethylphenyl)ethane, |
| 19.65 weight % of | 2-(trans-4-pentylcyclohexyl)-1-(p-ethoxyphenyl)ethane, |
| 8.59 weight % of | 1-[2-(trans-4-butylcyclohexyl)ethyl]-4-(trans-4-pentylcyclohexyl)benzene, |
| 5.43 weight % of | 4-[2-(trans-4-butylcyclohexyl)ethyl]-4′-(trans-4-pentylcyclohexyl)biphenyl, |
| 9.30 weight % of | 4-[2-(trans-4-butylcyclohexyl)ethyl]-4′-(trans-4-pentylcyclohexyl)-1,1′-ethylene-dibenzene, |

-continued

| Mixture 2 |
| --- |
| 4.65 weight % of 4'-(trans-4-pentylcyclohexyl)-4-biphenyl-carboxylic acid trans-4-(p-propylphenyl)-cyclohexyl ester; | m.p. < −30° C., cl.p. 100° C., nematic; $\Delta\epsilon=6.46$; $V_{10}=2.61$ V; $V_{50}=2.93$ V; $t_{on}=31$ ms, $t_{off}=42$ ms; $\eta=27$ cP; $N_{max}=73$; $\Delta n=0.131$.

| Mixture 3 |
| --- |
| 4.49 weight % of 4'-ethyl-4-cyanobiphenyl, |
| 2.99 weight % of 4'-propyl-4-cyanobiphenyl, |
| 5.09 weight % of 4'-butyl-4-cyanobiphenyl, |
| 13.82 weight % of 4-(trans-4-pentylcyclohexyl)benzonitrile, |
| 8.89 weight % of 4'-(trans-4-pentylcyclohexyl)-4-cyanobiphenyl, |
| 7.41 weight % of trans-4-butylcyclohexanecarboxylic acid p-ethoxyphenyl ester, |
| 6.59 weight % of trans-4-pentylcyclohexanecarboxylic acid p-methoxyphenyl ester, |
| 3.10 weight % of 2-(trans-4-propylcyclohexyl)-1-(p-ethylphenyl)ethane, |
| 19.65 weight % of 2-(trans-4-pentylcyclohexyl)-1-(p-ethoxyphenyl)ethane, |
| 8.59 weight % of 1-[2-(trans-4-butylcyclohexyl)ethyl]-4-(trans-4-pentylcyclohexyl)benzene, |
| 5.43 weight % of 4-[2-(trans-4-butylcyclohexyl)ethyl]-4'-(trans-4-pentylcyclohexyl)biphenyl, |
| 9.30 weight % of 4-[2-(trans-4-butylcyclohexyl)ethyl]-4'-(trans-4-pentylcyclohexyl)-1,1'-ethylenedibenzene, |
| 4.65 weight % of 4'-(trans-4-pentylcyclohexyl)-4-biphenylcarboxylic acid trans-4-(p-propylphenyl)-cyclohexyl ester; | m.p. < −30° C., cl.p. 98° C., nematic.

| Mixture 4 |
| --- |
| 4.49 weight % of 4'-ethyl-4-cyanobiphenyl, |
| 2.99 weight % of 4'-propyl-4-cyanobiphenyl, |
| 5.09 weight % of 4'-butyl-4-cyanobiphenyl, |
| 13.82 weight % of 4-(trans-4-pentylcyclohexyl)benzonitrile, |
| 4.40 weight % of 4''-pentyl-4-cyano-p-terephenyl, |
| 4.49 weight % of 4'-(trans-4-pentylcyclohexyl)-4-cyanobiphenyl, |
| 3.10 weight % of 1-(trans-4-ethylcyclohexyl)-4-propylbenzene, |
| 7.41 weight % of trans-4-butylcyclohexanecarboxylic acid p-ethoxyphenyl ester, |
| 6.59 weight % of trans-4-pentylcyclohexanecarboxylic acid p-methoxyphenyl ester, |
| 19.65 weight % of 2-(trans-4-pentylcyclohexyl)-1-(p-ethoxyphenyl)ethane, |
| 8.59 weight % of 1-[2-(trans-4-butylcyclohexyl)ethyl]-4-(trans-4-pentylcyclohexyl)benzene, |
| 5.43 weight % of 4-[2-(trans-4-butylcyclohexyl)ethyl]-4'-(trans-4-pentylcyclohexyl)biphenyl, |
| 9.30 weight % of 4-[2-(trans-4-butylcyclohexyl)ethyl]-4'-(trans-4-pentylcyclohexyl)-1,1'-ethylenedibenzene, |
| 4.65 weight % of 4'-(trans-4-pentylcyclohexyl)-4-biphenylcarboxylic acid p-(trans-4-propylcyclohexyl)phenyl ester; | m.p. < −30° C., cl.p. 100° C., nematic.

The following Examples illustrate the manufacture of the compounds provided by the invention, the preparation of certain starting materials and the use of the compounds provided by the invention in chromatography. In the Examples, C denotes a crystalline phase, S denotes a smectic phase, N denotes a nematic phase and I denotes the isotropic phase. Unless otherwise stated, percentages and ratios relating to solvent mixtures are expressed in volume, purity data determined by gas chromatography are expressed in area % and the remaining percentages and ratios are expressed in weight. Temperatures are in degrees Celsius (°C.), normal pressure is about 1 atmosphere and room temperature is about 23° C. The petroleum ether is a well-known mixture of low-boiling hydrocarbons. Unless indicated otherwise, the Examples were carried out as written.

EXAMPLE 1

1.40 g of 4'-(trans-4-pentylcyclohexyl)-4-biphenylcarboxylic acid were heated to boiling for 3 hours with 0.82 g of thionyl chloride in 25 ml of benzene. The solvent and excess thionyl chloride were distilled off and the residue was taken up twice in 25 ml of toluene each time and concentrated.

The crude 4'-(trans-4-pentylcyclohexyl)-4-biphenylcarboxylic acid chloride obtained was dissolved in 40 ml of benzene and then added dropwise to a solution of 0.90 g of trans-4-(p-propylphenyl)cyclohexanol in 20 ml of pyridine. The mixture was stirred at a bath temperature of 65° C. overnight, then poured into ice-water and extracted with diethyl ether. The extract was washed four times with 25 ml of 3N hydrochloric acid each time, then washed with 25 ml of 2N sodium carbonate solution and several times with water, dried over sodium sulphate and concentrated. The crude 4'-(trans-4-pentylcyclohexyl)-4-biphenylcarboxylic acid trans-4-(p-propylphenyl)cyclohexyl ester obtained was recrystallized once from ethanol containing a small amount of ethyl acetate and once from ethyl acetate. Yield 1.1 g; m.p. (C-S) 131.2° C.; phase transition S-N 143.3° C.; cl.p. (N-I) 337.5° C.

The following compounds were manufactured in an analogous manner:

p-(Trans-4-pentylcyclohexyl)benzoic acid trans-4-(p-propylphenyl)cyclohexyl ester; m.p. (C-S) 116.1° C., phase transition S-N 118.8° C., cl.p. (N-I) 262.7° C.

p-(Trans-4-pentylcyclohexyl)benzoic acid p-(trans-4-propylcyclohexyl)phenyl ester; phase transition C-C 92.5° C., m.p. (C-S) 135.6° C., phase transition S-N 142.5° C., cl.p. (N-I) 310° C.

p-[2-Trans-4-pentylcyclohexyl)ethyl]benzoic acid trans-4-(p-propylphenyl)cyclohexyl ester; m.p. (C-S) 110° C., phase transition S-N 118° C., cl.p. (N-I) 213.5° C.

p-[2-(Trans-4-pentylcyclohexyl)ethyl]benzoic acid p-(trans-4-propylcyclohexyl)phenyl ester; m.p. (C-S) 117.3° C., phase transition S-N 133° C., cl.p. (N-I) 262.5° C.

4'-(Trans-4-pentylcyclohexyl)-4-biphenylcarboxylic acid trans-4-(p-butylphenyl)cyclohexyl ester; m.p. (C-S) 107.0° C. or 112.7° C. or 117.6° C. (3 modifications), phase transition S-N 149.1° C. cl.p. (N-I) 333.0° C.

Further, all compounds of formula I referred to in Examples 2 and 5 can be manufactured in an analogous manner.

EXAMPLE 2

0.40 g of 4-hydroxy-4'-(trans-4-pentylcyclohexyl)-biphenyl, 0.21 g of trans-4-propylcyclohexanecarboxylic acid and 0.025 g of (4-dimethylamino)pyridine were dissolved in 25 ml of dichloromethane and then 0.31 g of N,N'-dicyclohexylcarbodiimide was added portionwise within 10 minutes while stirring. The mixture was left to stand at room temperature for 3 days and then the precipitate was filtered off. The filtrate was diluted with dichloromethane, washed twice with 20 ml of saturated sodium bicarbonate solution each time and then with water, dried over sodium sulphate and concentrated. The crude trans-4-propylcyclohexanecarboxylic acid 4'-(trans-4-pentylcyclohexyl)-4-biphenylyl ester obtained was chromatographed on silica gel with hexane/dioxane (volume ratio 19:1). The fractions which were pure according to thin-layer chromatography were pooled and recrystallized from ethyl acetate. Yield 0.33 g; m.p. (C-S) 92° C., cl.p. (N-I) 319° C.; further phase transitions: S-S 154° C., S-S 218.5° C., S-N 240° C.

The following compounds were manufactured in an analogous manner:

Trans-4-(p-pentylphenyl)cyclohexanecarboxylic acid trans-4-(p-propylphenyl)cyclohexyl ester; m.p. (C-S) 66.5° C., phase transition S-N 183° C., cl.p. (N-I) 234.5° C.

Trans-4-[2-(trans-4-pentylcyclohexyl)ethyl]cyclohexanecarboxylic acid trans-4-(p-propylphenyl)cyclohexyl ester; m.p. (C-S) 65.4° C., phase transition S-N 228.4° C., cl.p. (N-I) 245.1° C.

4'-(Trans-4-pentylcyclohexyl)-4-biphenylcarboxylic acid trans-4-propylcyclohexyl ester; m.p. (C-S) 111.8° C., phase transition S-N 118° C., cl.p. (N-I) 282.5° C.

4'-(Trans-4-pentylcyclohexyl)-4-biphenylcarboxylic acid p-(trans-4-propylcyclohexyl)phenyl ester; m.p. (C-S) 153.9° C., phase transition S-N 195.0° C. cl.p. (N-I) 419° C.

4'-(Trans-4-pentylcyclohexyl)-4-biphenylcarboxylic acid p-(trans-4-butylcyclohexyl)phenyl ester; m.p. (C-S) 140° C., phase transition S-N 201° C., cl.p. (N-I) 413° C.

4'-(Trans-4pentylcyclohexyl)-4-biphenylcarboxylic acid p-[2-(trans-4-butylcyclohexyl)ethyl]phenyl ester; m.p. (C-S) 139° C. or 145° C. (2 modifications), phase transition S-N 189.5° C., cl.p. (N-I) 358.5° C.

Further, all compounds of formula I referred to in Examples 1 and 5 can be manufactured in an analogous manner.

EXAMPLE 3

A mixture of 2.51 g of p-pentylbenzyl-triphenylphosphonium bromide and 615 mg of a cis/trans mixture (about 1:1) of 4-cyanocyclohexanecarboxaldehyde in 30 ml of t-butyl methyl ether was placed at 0° C. under argon gasification in a sulphonation flask fitted with a thermometer and solid substance addition tube, treated within 2 minutes with 673 mg of solid potassium t-butylate and subsequently stirred for a further 1.5 hours. The red-brown heterogeneous mixture was then poured into 100 ml of water and extracted three times with 100 ml of diethyl ether each time. The organic phases were washed twice with 50 ml of water each time and once with 50 ml of saturated sodium chloride solution, dried over magnesium sulphate and concentrated. The residue was suspended in 150 ml of hexane, freed from precipitated triphenylphosphine oxide by filtration (rinsing with hexane) and the filtrate was concentrated. Low-pressure chromatography (0.4 bar) of the resulting oil (1.36 g) on silica gel using 3% ethyl acetate/petroleum ether as the eluting agent gave 1.02 g (81%) of 4-[2-(p-pentylphenyl)ethenyl]cyclohexanecarbonitrile as a colourless oil; Rf values (10% ethyl acetate/petroleum ether): 0.27 and 0.37 (stereoisomer mixture).

956 mg of the 4-[2-(p-pentylphenyl)ethenyl]cyclohexanecarbonitrile obtained were dissolved in 50 ml of toluene in a sulphonation flask, treated with 150 mg of 10% palladium/carbon and hydrogenated at normal pressure and room temperature until the hydrogen uptake came to a standstill (about 30 minutes). Filtration of the mixture (rinsing with toluene), concentration of the filtrate and low-pressure chromatography (0.4 bar) of the residue (890 mg) on silica gel using 5% ethyl acetate/petroleum ether as the eluting agent gave 788 mg (82%) of 4-[2-(p-pentylphenyl)ethyl]cyclohexanecarbonitrile (cis/trans ratio about 1:3 according to gas chromatography and NMR spectroscopy). Two-fold crystallization from pentane at −20° C. finally yielded the trans-nitrile (trans content 98.8%); m.p. (C-I) 22.4° C., cl.p. (N-I) −14.1° C., Rf value (5% ethyl acetate/petroleum ether) 0.22.

The trans-4-[2-(p-pentylphenyl)ethyl]cyclohexanecarbonitrile obtained can be converted into trans-4-[2-(p-pentylphenyl)ethyl]cyclohexanecarboxylic acid in an analogous manner to Example 4.

EXAMPLE 4

A mixture of 3.60 g of trans-4-[2-(trans-4-pentylcyclohexyl)ethyl]cyclohexanecarbonitrile and 5.9 g of potassium hydroxide in 50 ml of diethylene glycol was heated to 180° C. for 22 hours in a rounded flask fitted with a reflux condenser. After cooling, the brown mixture was acidified with about 100 ml of 2N hydrochloric acid and extracted three times with 150 ml of diethyl ether each time. The organic phases were washed three times with 100 ml of water each time, dried over magnesium sulphate and concentrated. Subsequent crystallization of the residue (3.74 g; cis/trans ratio about 1:3) from 100 ml of hexane gave 2.12 g (55%) of pure trans-4-[2-(trans-4-pentylcyclohexyl)ethyl]cyclohexanecarboyxlic acid; m.p. 143.0° C., cl.p. 209.9° C.

EXAMPLE 5

A solution of 0.902 ml of dimethylformamide in 20 ml of acetonitrile was placed at −20° C. while gassing with argon in a sulphonation flask fitted with a mechanical stirrer, serum cap, thermometer and dropping funnel and treated within 2 minutes with 0.338 ml of oxalyl chloride. After completion of the addition, the mixture was stirred at −20° C. for a further 20 minutes and then 1.0 g of trans-4-(trans-4-pentylcyclohexyl)cyclohexanecarboxylic acid was introduced into the resulting white suspension via a solid substance addition tube. The mixture was subsequently stirred at −20° C. for 30 minutes and then treated dropwise at −20° C. within 10 minutes with a solution of 1.97 g of trans-4-(p-propylphenyl)cyclohexanol and 0.9 ml of pyridine in 20 ml of acetonitrile. The mixture was stirred for a further 15 hours while slowly warming to room temperature, then poured into 200 ml of cold 2N sodium carbonate solution and extracted three times with 200 ml of methylene chloride each time. The organic phases were washed once with 100 ml of 2N sodium carbonate solution and twice with 200 ml of water each time, dried over magnesium sulphate and concentrated. Low-pressure chromatography (0.5 bar) of the residue (2.6 g) on 140 g of silica gel using toluene/hexane (volume ratio 1:1) gave 757 mg (44%) of trans-4-(trans-4-pentylcyclohexyl)cyclohexanecarboxylic acid trans-4-(p-propylphenyl)cyclohexyl ester as colourless crystals. A single recrystallization from acetone yielded analytically-pure product of m.p. (C-S) 63.3° C., phase transition S-N 241.5° C., cl.p. (N-I) 285.5° C.

The following compound was manufactured in an analogous manner:

Trans-4-(trans-4-pentylcyclohexyl)cyclohexanecarboxylic acid p-(trans-4-propylcyclohexyl)phenyl ester;

m.p. (C-S) 44° C., phase transition S-N 241.5° C., cl.p. (N-I) 310° C.

Further, all compounds of formula I referred to in Examples 1 and 2 can be manufactured in an analogous manner.

EXAMPLE 6

An isomer mixture of 4-cis/trans-propyl-1-(4-propylphenyl)cyclohexane (cis/trans ratio about 1:1) was separated at an analysis temperature of 160° C. on a packed column (length 3 m, internal diameter 2.2 mm) which was filled with 2 weight % of 4'-(trans-4-pentylcyclohexyl)-4-biphenylcarboxylic acid trans-4-(p-propylphenyl)cyclohexyl ester on Gas-Chrom Q ® (Applied Science Laboratories, Inc., State College, Pa.), 120/140 mesh. Nitrogen (30 ml/minute) was used as the carrier gas. The retention time was 20 minutes for the cis isomer and 39 minutes for the trans isomer. The relative retention α for the trans isomer was 2.0 (α=1.0 for the cis isomer).

EXAMPLE 7

An isomer mixture of methyl oleate [(Z) isomer] and methyl elaidate [(E) isomer] (Z/E ratio about 3:1) was separated at an analysis temperature of 150° C. on a packed column (length 2 m, internal diameter 2.2 mm) which was filled with 2 weight % of 4'-(trans-4-pentylcyclohexyl)-4-biphenylcarboxylic acid trans-4-propylcyclohexyl ester on Gas-Chrom Q ® (Applied Science Labs), 120/140 mesh. Nitrogen (30 ml/minute) was used as the carrier gas. The retention time was 32 minutes for the methyl oleate and about 35 minutes for the methyl elaidate. The relative retention α for the methyl elaidate was 1.1 (α=1.0 for methyl oleate).

EXAMPLE 8

A mixture of anthracene and phenanthrene (isomer ratio anthracene/phenanthrene about 3:1) was separated at an analysis temperature of 180° C. on a packed column (length 3 m, internal diameter 2.2 mm) which was filled with 2 weight % of 4'-(trans-4-pentylcyclohexyl)-4-biphenylcarboxylic acid trans-4-(p-propylphenyl)cyclohexyl ester on Gas-Chrom Q ® (Applied Science Labs), 120/140 mesh. Nitrogen (30 ml/minute) was used as the carrier gas. The retention time was 10 minutes for phenanthrene and 13 minutes for anthracene. The relative retention α for anthracene was 1.3 (α=1.0 for phenanthrene).

We claim:

1. A compound of the formula:

$$R^1-A^1-X^1-A^2-X^2-A^3-X^3-A^4-X^4-A^5-R^2 \quad I$$

wherein one of $X^1$ and $X^2$ is —COO— or —OOC— and the other is a single covalent bond or —$CH_2CH_2$—; $X^3$ and $X^4$ individually are a single covalent bond or —$CH_2CH_2$—; with the proviso that at most one of $X^1$, $X^2$, $X^3$ and $X^4$ is —$CH_2CH_2$—; rings $A^1$ and $A^5$ individually are 1,4-phenylene or trans-1,4-cyclohexylene; rings $A^2$, $A^3$ and $A^4$ individually are 1,4-phenylene or, when ring $A^2$, $A^3$ or $A^4$ is not linked with at least one of the other two of these rings by a single covalent bond then such ring also can be trans-1,4-cyclohexylene, with the proviso that at least one of rings $A^1$ through $A^5$ is 1,4-phenylene; and $R^1$ and $R^2$ individually are straight-chain alkyl of 1-7 carbon atoms, or when $R^1$ or $R^2$ is attached to 1,4-phenylene such $R^1$ or $R^2$ also can be straight-chain alkoxy of 1 to 7 carbon atoms.

2. The compound of claim 1 wherein $X^2$ is —COO— or —OOC—; and $X^1$ is —$CH_2CH_2$—.

3. The compound of claim 1 wherein one of $X^1$ and $X^2$ is —COO— or —OOC— and the other is a single covalent bond; and $X^3$ and $X^4$ individually are a single covalent bond.

4. The compound of claim 1 wherein at least one of rings $A^1$ through $A^5$ is trans-1,4-cyclohexylene.

5. The compound of claim 1 wherein one of $X^1$ and $X^2$ is —COO— or —OOC— and the other is a single covalent bond; $X^3$ and $X^4$ individually are a single covalent bond; rings $A^1$ and $A^5$ individually are 1,4-phenylene or trans-1,4-cyclohexylene; rings $A^2$, $A^3$ and $A^4$ individually are 1,4-phenylene or, when ring $A^2$, $A^3$ or $A^4$ is not linked with at least one of the other two of these rings by single covalent bond, then such ring also can be trans-1,4-cyclohexylene; with the proviso that at least one of rings $A^1$ through $A^5$ is 1,4-phenylene and with the further proviso that at least one of rings $A^1$ through $A^5$ is trans-1,4-cyclohexylene.

6. The compound of claim 1 wherein $X^2$ is —COO— or —OOC—.

7. The compound of claim 1 wherein $R^1$ and $R^2$ individually are straight-chain alkyl of 1 to 7 carbon atoms.

8. The compound of claim 1 wherein the sum of the carbon atoms in $R^1$ and $R^2$ is 5 to 10.

9. A liquid crystalline mixture comprising at least two components at least one of which is a compound of the formula:

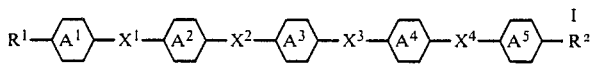

$$R^1-A^1-X^1-A^2-X^2-A^3-X^3-A^4-X^4-A^5-R^2 \quad I$$

wherein one of $X^1$ and $X^2$ is —COO— or —OOC— and the other is a single covalent bond or —$CH_2CH_2$—; $X^3$ and $X^4$ individually are a single covalent bond or —$CH_2CH_2$—, with the proviso that at most one of $X^1$, $X^2$, $X^3$ and $X^4$ is —$CH_2CH_2$—; rings $A^1$ and $A^5$ individually are 1,4-phenylene or trans-1,4-cyclohexylene; rings $A^2$, $A^3$ and $A^4$ individually are 1,4-phenylene or, when ring $A^2$, $A^3$ or $A^4$ is not linked with at least one of the other two of these rings by a single covalent bond then such ring also can be trans-1,4-cyclohexylene, with the proviso that at least one of rings $A^1$ through $A^5$ is 1,4-phenylene; and $R^1$ and $R^2$ individually are straight-chain alkyl of 1-7 carbon atoms, or when $R^1$ or $R^2$ is attached to 1,4-phenylene such $R^1$ or $R^2$ also can be straight-chain alkoxy of 1 to 7 carbon atoms.

10. The liquid crystalline mixture of claim 9 wherein the other component is selected from the group of compounds consisting of:

$$R^3-\bigcirc-\bigcirc-CN \quad VII$$

wherein $R^3$ is straight-chain alkyl or alkoxy of 2 to 7 carbon atoms;

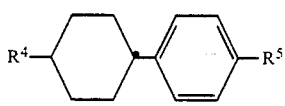 VIII wherein $R^4$ is straight-chain alkyl of 2 to 7 carbon atoms and $R^5$ is cyano or straight-chain alkyl of 1 to 7 carbon atoms;

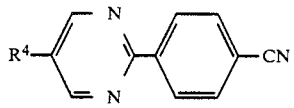 IX wherein $R^4$ is as above;

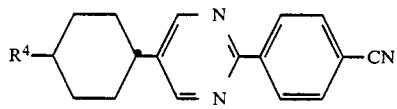 X wherein $R^4$ is as above;

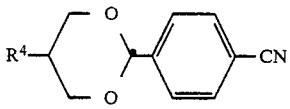 XI wherein $R^4$ is as above;

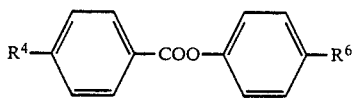 XII wherein $R^6$ is cyano or straight-chain alkoxy of 1 to 6 carbon atoms and $R^4$ is as above;

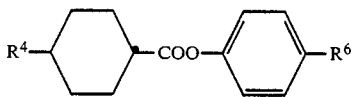 XIII wherein $R^4$ and $R^6$ are as above;

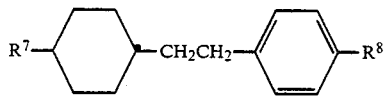 XIV wherein $R^7$ is straight-chain alkyl of 3 to 7 carbon atoms and $R^8$ is cyano or straight-chain alkyl or alkoxy of 1 to 7 carbon atoms;

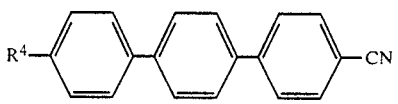 XV wherein $R^4$ is as above; and

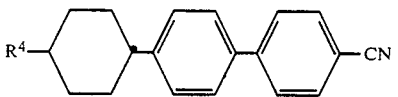 XVI wherein $R^4$ is as above.

11. The compound of claim 1, 4'-(trans-4-pentylcyclohexyl)-4-biphenylcarboxylic acid trans-4-(p-propylphenyl)cyclohexyl ester.

12. The compound of claim 1, 4'-(trans-4-pentylcyclohexyl)-4-biphenylcarboxylic acid trans-4-(p-butylphenyl)cyclohexyl ester.

13. The compound of claim 1, 4'-(trans-4-pentylcyclohexyl)-4-biphenylcarboxylic acid p-(trans-4-propylcyclohexyl)phenyl ester.

14. The compound of claim 1, 4'-(trans-4-pentylcyclohexyl)-4-biphenylcarboxylic acid p-(trans-4-butylcyclohexyl)phenyl ester.

15. The compound of claim 1 wherein the compound is selected from the group of compounds consisting of:

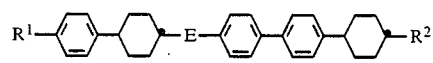 Ij

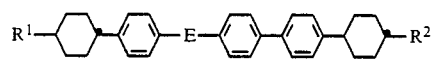 Ik and

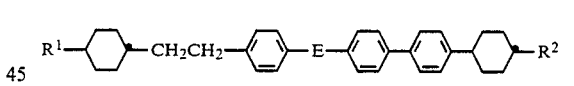 In wherein E is —COO— or —OOC—; and $R^1$ and $R^2$ individually are straight-chain alkyl of 1-7 carbon atoms, or when $R^1$ or $R^2$ is attached to 1,4-phenylene, such $R^1$ or $R^2$ may also be alkoxy of 1 to 7 carbon atoms.

16. The compound of claim 15 having the formula:

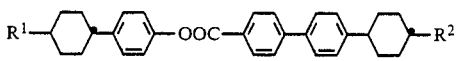 Ik wherein $R^1$ and $R^2$ individually are straight-chain alkyl of 1-7 carbon atoms.

* * * * *